Nov. 7, 1950 F. E. BERTRAND ET AL 2,528,718
MACHINE AND METHOD FOR USE IN MAKING
RIBBED STRIPS FOR INSOLES
Filed Feb. 13, 1947 5 Sheets-Sheet 1

Inventors
Frederic E. Bertrand
Alfred S. Clark
By their Attorney

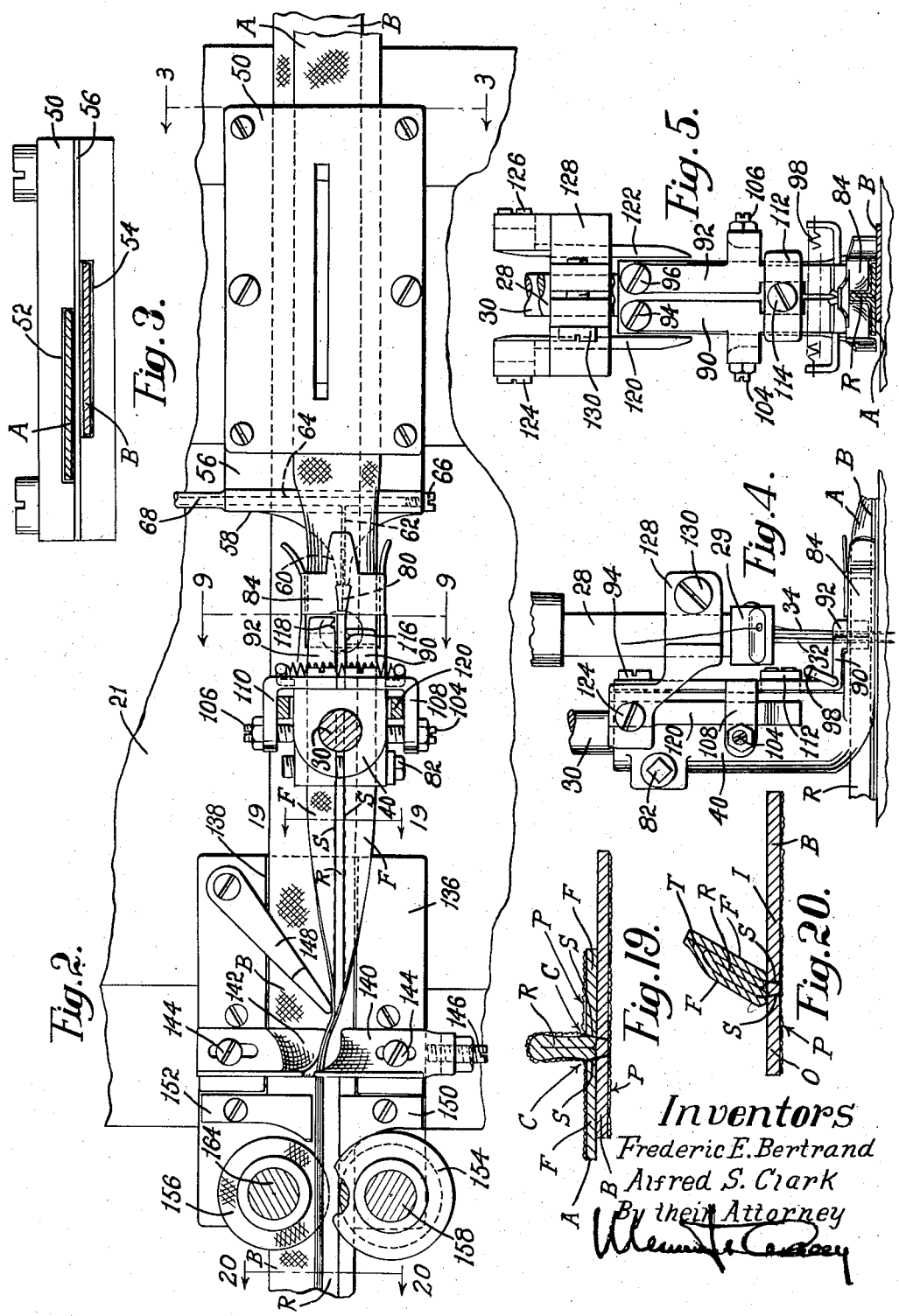

Nov. 7, 1950     F. E. BERTRAND ET AL     2,528,718
MACHINE AND METHOD FOR USE IN MAKING
RIBBED STRIPS FOR INSOLES
Filed Feb. 13, 1947     5 Sheets-Sheet 3
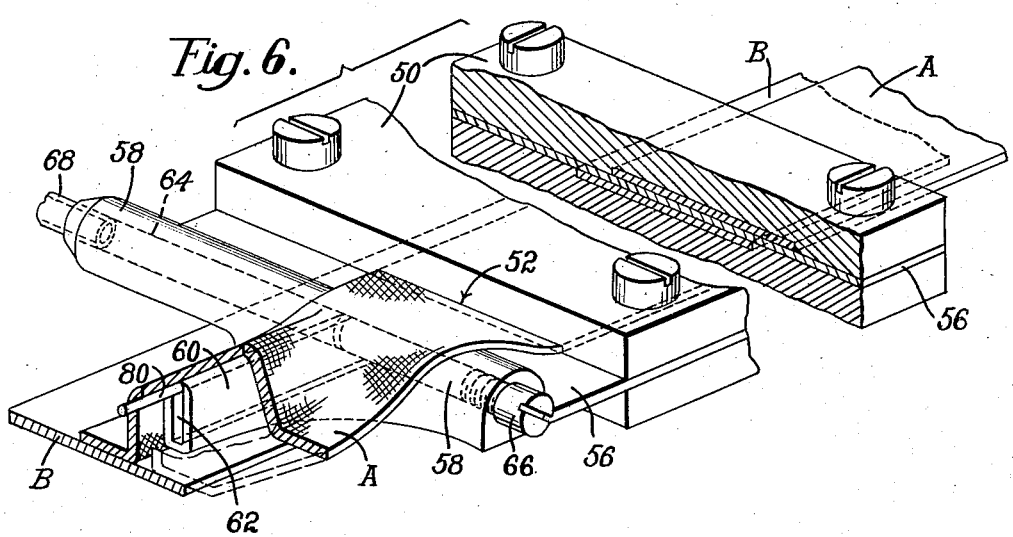
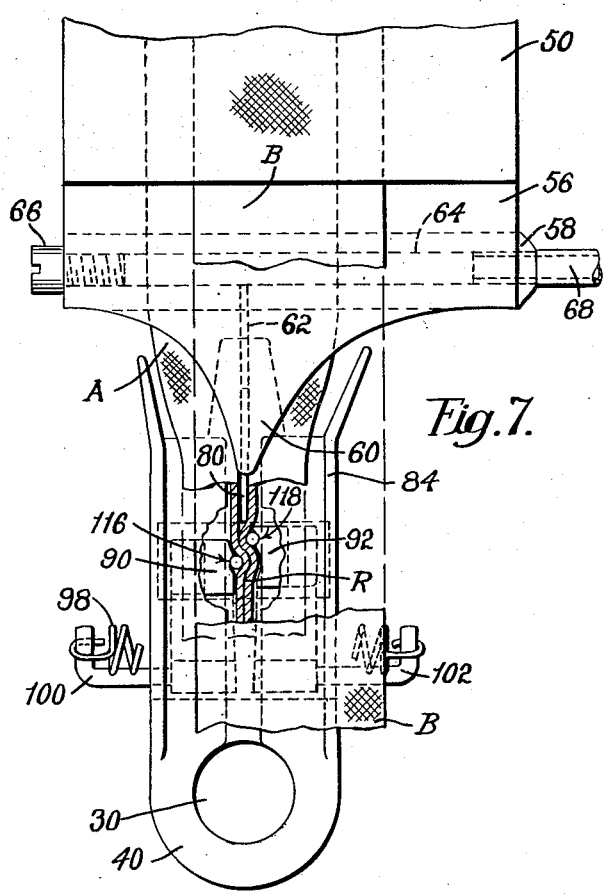
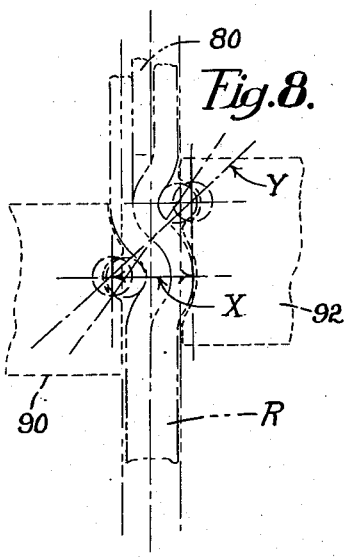
Inventors
Frederic E. Bertrand
Alfred S. Clark
By their Attorney Nov. 7, 1950  F. E. BERTRAND ET AL  2,528,718
MACHINE AND METHOD FOR USE IN MAKING
RIBBED STRIPS FOR INSOLES
Filed Feb. 13, 1947  5 Sheets-Sheet 4
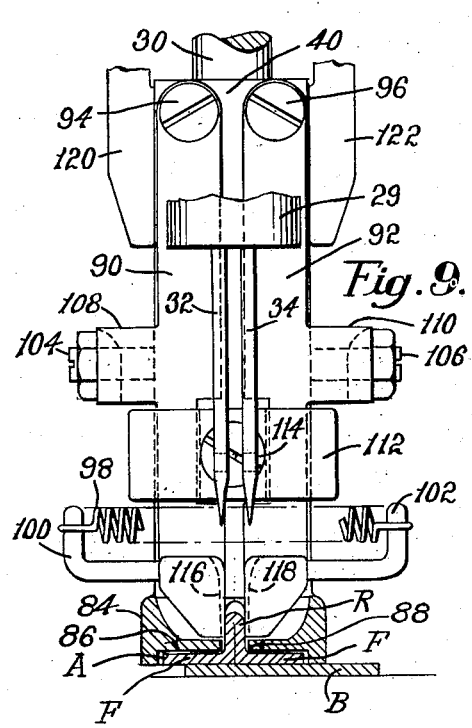
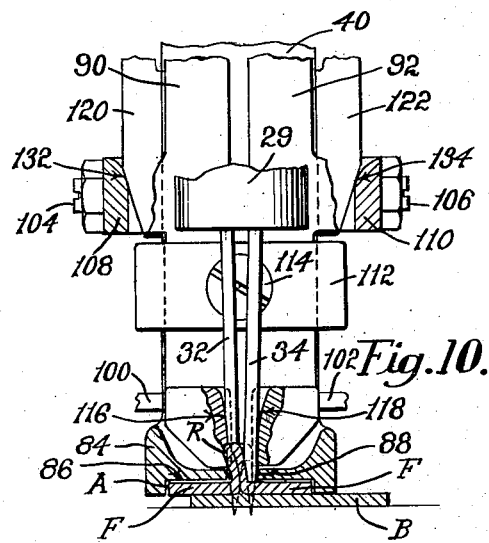
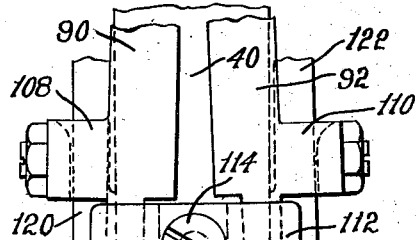
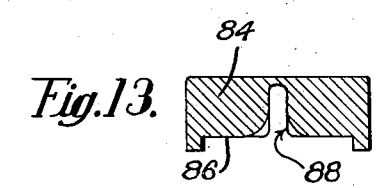
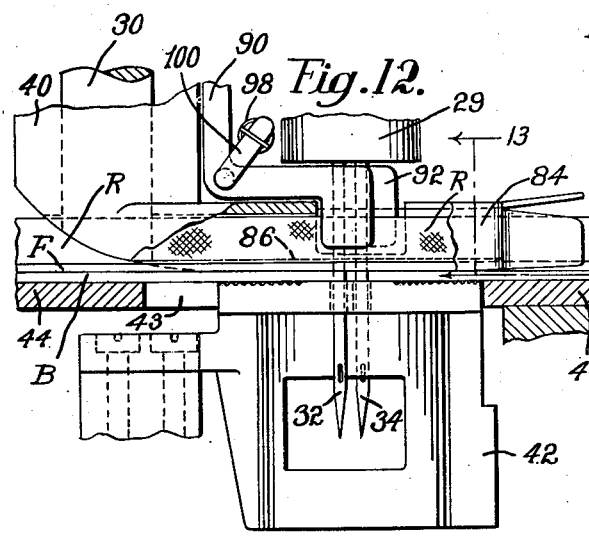
Inventors
Frederic E. Bertrand
Alfred S. Clark
By their Attorney

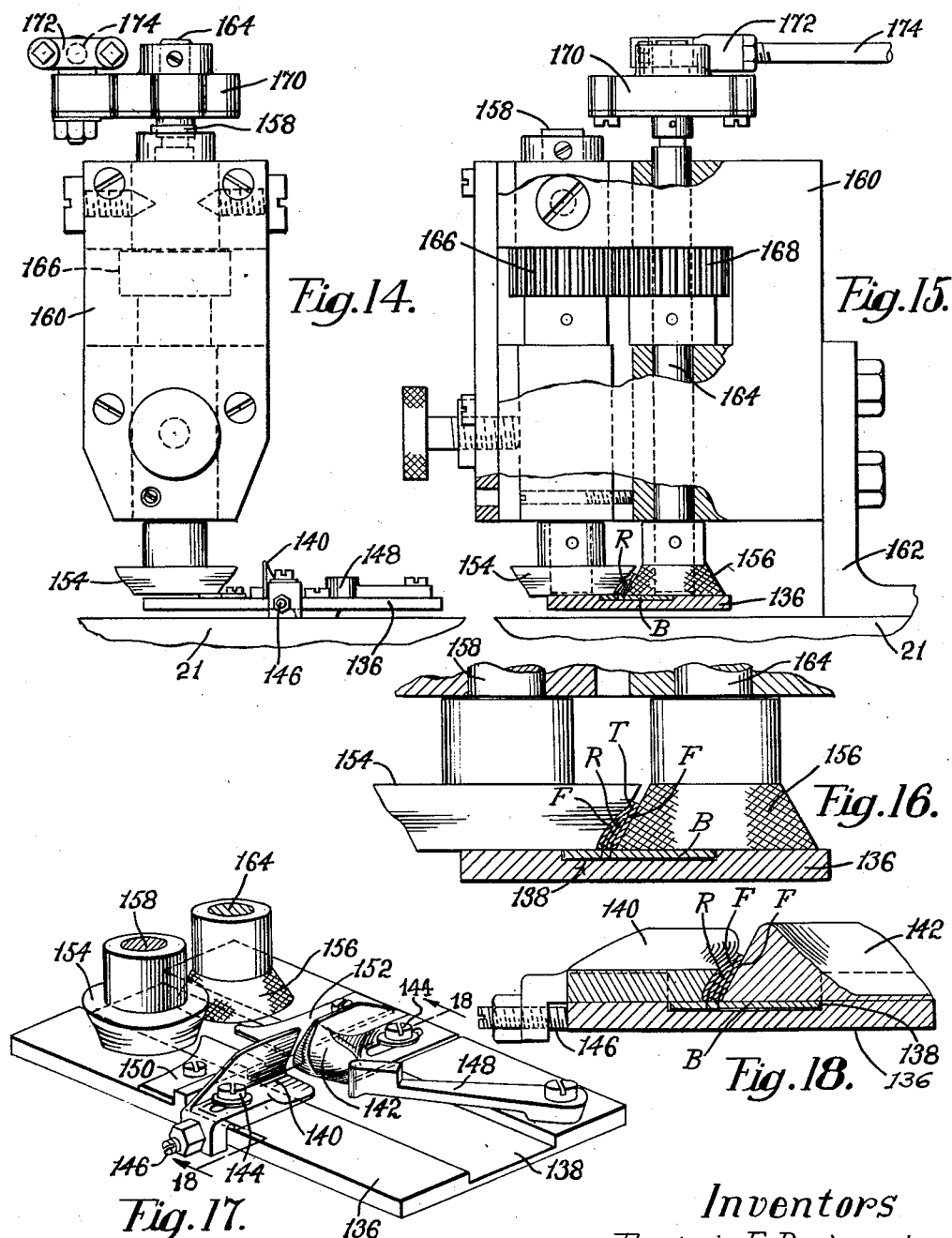

Patented Nov. 7, 1950

2,528,718

UNITED STATES PATENT OFFICE 2,528,718

MACHINE AND METHOD FOR USE IN MAKING RIBBED STRIPS FOR INSOLES

Frederic E. Bertrand, Lynn, and Alfred S. Clark, Beverly, Mass., assignors to United Shoe Machinery Corporation, Flemington, N. J., a corporation of New Jersey Application February 13, 1947, Serial No. 728,228

53 Claims. (Cl. 112—147)

This invention relates to insoles for use in the manufacture of welt shoes and, more particularly, to machines and methods for use in making ribbed strips adapted for attachment to such insoles to provide sewing ribs thereon.

An important object of the present invention is to provide an improved machine for use in making ribbed strips adapted for attachment to insoles, the strips being of a type disclosed in Letters Patent of the United States No. 2,326,119, granted August 10, 1943, upon an application filed in the name of Frederic E. Bertrand.

Another object of the invention is to provide an improved method of making ribbed strips of the type referred to in the practice of which the machine is particularly adapted for use.

To the accomplishment of these objects and in accordance with one of its features, the invention provides an improved machine having, in combination, a guide for positioning a pair of strips in superimposed relation to each other, said strips being pre-coated on one side with pressure-responsive cement, and mechanism for drawing the strips progressively through the guide. As herein illustrated, the guide comprises a stationary member having slots therein arranged for receiving the strips and positioning them in superimposed relation to each other and also in a predetermined position transversely or widthwise relatively to each other.

The illustrated machine is also provided with means for folding one of the strips to form a rib with respect to the other strip and with further means for securing the strips together after the rib has been formed. As herein illustrated, the folding means comprises cooperating members constructed and arranged to engage the upper strip and fold it progressively with respect to the lower strip as the strips are drawn or fed through the folder, thereby forming a two-ply rib relatively to the lower strip, the rib resting on said lower strip and being provided with flanges extending laterally from opposite sides of the rib and overlapping said lower strip.

Another feature of the invention resides in means provided in the machine for introducing material between the plies of the rib for maintaining the rib in its folded position. As illustrated, this means preferably comprises a nozzle forming a part of the folding means and arranged to introduce or inject material such as adhesive or cement into the fold forming the rib, that is, between the plies of the rib, while the upper strip is being folded and during the progressive movement of the strips through the machine, the nozzle being continuously supplied with adhesive material by constantly operating means provided for that purpose, this latter means preferably being pressure controlled or operated.

In accordance with still another feature of the invention, the means for securing the strips together after the upper strip has been folded comprises, in one instance, a pair of needles for inserting stitches through the strips at opposite sides of the rib, the needles, as herein illustrated, being staggered or offset diagonally relatively to each other lengthwise of the rib. As the strips are drawn or fed progressively through the machine, further means associated with the folder is provided for twisting or bending the rib to cause it to move past the needles in an oblique or angular direction extending substantially at right angles to a line intersecting the axes of the needles, thereby causing the needles to span or straddle the rib so that the stitches will be located at opposite sides thereof even though the space between the needles transversely of the rib is less than the thickness of the rib.

It is desirable in the construction of the present ribbed strip to locate the stitches as closely as possible to the opposite sides of the rib or, in other words, to position them substantially in the inner corners or apexes of the creases or angles formed between the rib and the flanges at the opposite sides of the rib. The present machine, therefore, is provided with means for accomplishing this result, this means, as herein illustrated, comprising members for engaging the needles as they move toward the work and for deflecting them inwardly or toward each other so that they will enter the strips substantially in the apexes of the creases or angles formed between the rib and flanges. As illustrated herein, the deflecting means preferably comprises semi-circular grooves formed in the twisting members above referred to, the grooves being inclined inwardly from the top to the bottom of said members so that they will engage the needles and deflect them before they enter the work, thereby causing the stitches to be positioned substantially in the apexes of the creases or angles formed at the opposite sides of the base of the rib irrespective of the thickness of the upper portion of the rib.

In accordance with still another feature of the invention, the machine is provided with means in the form of a folding member for turning the opposite flanges of the upper or folded strip upwardly against the sides of the two-ply rib after the stitches have been inserted, thereby enclosing the rib, the folder being also arranged to bend the rib and upturned flanges into an inclined position relatively to the lower strip which now forms the base portion of the ribbed strip. As herein illustrated, the folding means is arranged to maintan the lower strip or base portion of the ribbed strip in a relatively flat position during the folding operation.

After the composite strip leaves the last-named means, it is subjected to progressive pressure adapted to shape or conform the rib into its final configuration and also to set it firmly at an inclined or acute angle relatively to the lower strip. This is accomplished, as herein disclosed, by means of a pair of pressing and shaping rolls which cooperate to engage and press the turned-up flanges firmly against the two-ply rib and against each other beyond the rib, the rolls being shaped particularly to accomplish this result and also to bend and set the completed rib at the desired angle of inclination relatively to the lower strip or base portion, this base portion providing inner and outer flanges for the rib. Since the upper or exposed surface of the upper strip has been previously coated with pressure-responsive cement, the flanges will readily adhere to the two-ply rib and to each other beyond the rib when pressed into such position by the rolls.

In accordance with its method aspect, the invention provides an improved method of making ribbed strips adapted for attachment to insoles to provide sewing ribs thereon which, as herein illustrated, comprises positioning a pair of strips in superimposed relation to each other and folding one of the strips progressively to form a two-ply rib with respect to the other strip with flanges extending laterally from opposite sides of the rib. The method further comprises securing the two strips permanently together at opposite sides of the base of the rib and, as illustrated, provides for securing the strips together, in accordance with one aspect, by inserting stitches substantially in the apexes of the angles or creases formed between the rib and flanges regardless of the thicknesses of different portions of the rib.

The method also includes the novel feature of introducing material progressively into the fold forming the rib, that is, between the plies of the two-ply rib, for maintaining the plies in their folded position. As herein illustrated, adhesive material is introduced during the folding operation and while the strips are moving progressively and in unison in their predetermined path, the material introduced comprising an adhesive or cement which is in a fluid or plastic condition and is preferably introduced by being injected under pressure into the fold forming the rib, this action taking place progressvely during the folding operation.

After the cement or other adhesive material has been introduced between the plies of the rib and after the strips have been permanently secured together, as described above, the method includes further novel steps for completing the construction of the composite ribbed strip, these steps, as herein illustrated, comprising turning the opposite flanges of the folded strip upwardly against the sides of the two-ply rib to enclose said rib and form a four-ply rib on the composite strip, this action taking place progressively during the movement of the strips along their path; a final conforming or compressing of the rib into the desired shape or configuration, and the bending of the completed rib into an inclined or slanting position relatively to the base portion of the strip formed by the flat lower strip, the rib being set firmly in such inclined position by pressure applied progressively during movement of the strips in their predetermined path, this path, as herein illustrated, being preferably a substantially straight or rectilinear path in order to facilitate the formation of the composite ribbed strip and to expedite the method whereby it is produced.

With the above and other aspects and features in view, the invention will now be described in detail in connection with the accompanying drawings and will thereafter be pointed out in the claims.

In the drawings:

Fig. 2 is an enlarged plan view of the elements of the machine which operate on the strips with parts broken away or shown in section;

Fig. 3 is an end view of the guide for positioning the strips in superimposed relation, the strips being sectioned on the line 3—3 of Fig. 2;

Fig. 4 is a side elevation of the folding, feeding and stitching mechanism illustrated in Fig. 2, the mechanism being shown in a lower or operating position;

Fig. 5 is a front elevation of the mechanism of Fig. 4 in a raised position;

Fig. 6 is an enlarged perspective view of strip guiding, folding and cementing mechanism with portions of the mechanism broken away or shown in section;

Fig. 7 is an inverted or bottom plan view of the strip folding and cementing mechanism and the means for bending or twisting the rib;

Fig. 8 is an enlarged diagrammatic view illustrating the manner in which the rib is twisted to permit it to pass between the needles of the sewing machine;

Fig. 9 is a transverse sectional view through the folding mechanism with the parts shown in an elevated position, the section being taken on the line 9—9 of Fig. 2;

Fig. 10 is a sectional view similar to Fig. 9 with the parts shown in a partially lowered position;

Fig. 11 is a similar view showing the parts fully lowered and including a portion of the throat plate and feed dog of the sewing machine;

Fig. 12 is a side elevation similar to Fig. 4 with the parts shown in the position illustrated in Fig. 11.

Fig. 13 is a transverse sectional view through the forward portion of the folder taken on the line 13—13 of Fig. 12;

Fig. 14 is a side elevation of the rolls for finally shaping and setting the rib and the mechanism for operating the rolls;

Fig. 15 is a front elevation of the shaping rolls with the ribbed strip shown in section;

Fig. 16 is an enlarged view of the shaping rolls and ribbed strip;

Fig. 17 is a perspective view of the strip folding and bending mechanism together with the shaping rolls;

Fig. 18 is an enlarged sectional view taken on the line 18—18 of Fig. 17 with the ribbed strip passing through the folders;

Fig. 19 is a greatly enlarged transverse section of the ribbed strip taken on the line 19—19 of Fig. 2; and Fig. 20 is an enlarged sectional view taken on the line 20—20 of Fig. 2 after the ribbed strip has been completed.

Figure 1:
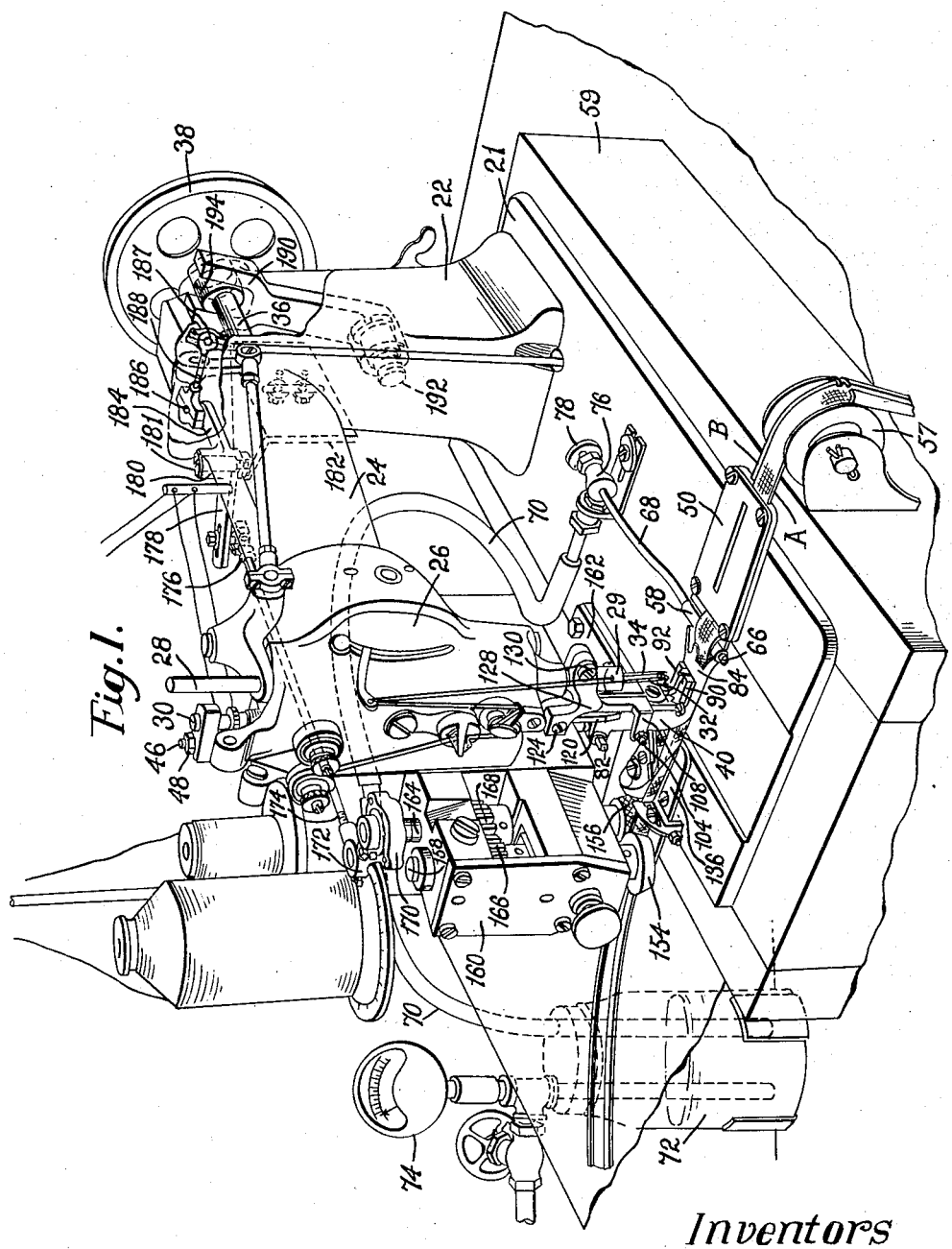
Fig. 1 is a perspective view of a machine embodying the present invention.

The invention is illustrated herein as embodied in a lock-stitch sewing machine of the compound feed type having a two-needle stitch forming mechanism and the usual four-motion feed, the machine herein illustrated by way of example being a Singer sewing machine No. 22W166. In its broader aspects, however, the invention is not limited in its application to embodiment in a machine of this particular type but may be utilized to advantage in any usual type of two-needle sewing machine provided with an intermittent step-by-step feed.

The illustrated machine is provided with a frame including a bed 21 and a standard 22 having the usual gooseneck 24 terminating in a head 26 which carries a reciprocating needle-bar 28 and a spring-pressed presser-bar 30, the needle-bar 28 having a cylindrical holder 29 secured thereto which carries two needles 32 and 34 arranged to cooperate with the usual thread-carrying loopers (not shown) actuated by suitable mechanism operated by a main shaft located below the bed 21 and driven by a motor or other usual source of power. The machine is also provided in the upper portion of the frame with a horizontal shaft 36 driven by a pulley 38 and actuating the stitch-forming and feeding mechanisms of the machine in the usual manner by means of further mechanisms mounted in the head 26. The mechanisms for operating the stitch-forming and four-motion feeding mechanisms of the machine form no part of the present invention and, since they are well known in the art, need not be described in detail herein but will be referred to hereinafter only in so far as may be necessary for a complete understanding of the invention.

The compound feed mechanism of the machine comprises the usual four-motion needle-feed of this type of sewing machine assisted in the present case by a member 40, substituted for the usual presser-foot and cooperating with a feed-dog 42 (Figs. 11 and 12), the member 40 comprising a folding member mounted on the presser-bar 30 in place of the usual presser-foot. The feed-dog 42 operates in a slot 43 in a throat plate 44 (Fig. 12) to engage and assist in feeding the work, the feed-dog being operated by conventional mechanism, including eccentrics and links (not shown), to impart to the feed-dog the four-motion movement which normally causes the feed-dog to cooperate with the presser-foot in gripping and feeding the work. In the present arrangement, however, the member 40 is not permitted to cooperate with the feed-dog 42 to grip the work but is restricted in its operating movement for a purpose which will be presently explained.

The heightwise movement of the presser-bar 30 is limited by a stop screw 46 (Fig. 1) threaded through an arm secured to the presser-bar, the screw 46 being retained in adjusted position by a nut 48 and being arranged to engage a surface on the head 26 to limit downward movement of the presser-bar and folder 40. The arrangement is such that the folder cooperates with the feed-dog 42 to confine the work during the stitching and feeding operations but not actually to grip the work. Consequently, the normal feeding function of these particular members is somewhat reduced or at least confined to whatever feeding movement may be imparted to the work by the frictional engagement of the feed-dog 42 with the lower side of the work in conjunction with the confining action of the member 40 which moves with the feed-dog but does not actually grip the work. Further functions of the folder will be explained more fully hereinafter.

The mechanism for operating upon the strips of tape utilized for making the composite ribbed strips of the present invention comprises a guide 50 having upper and lower guideways 52, 54 formed therein which are arranged to position the pair of strips in superimposed relation to each other and also in a predetermined transverse position relatively to each other, as illustrated in Fig. 3. The strips are preferably composed of textile or fabric material, such as canvas or Gem duck, although they might be composed of other sheet materials which are relatively tough and strong and yet flexible enough to serve the purpose, for example, leather, rubber or plastic material. Each strip is pre-coated, the upper strip on its upper face and the lower strip on its lower face, with pressure-responsive cement such as rubber cement, latex or cements comprising synthetic rubber-like materials, this same adhesive preferably being used also to coat the margins of the insoles to which the completed ribbed strips are applied. The upper strip is indicated in the drawings by the letter A and the lower strip by the letter B. A thin plate 56 separates the guideways 52, 54 in the guide 50 and prevents the strips from engaging each other as they are drawn through the guide. The strips A and B, precoated as described, may be supplied to the machine from a pair of reels (not shown) located adjacent to the machine, the strips being directed into the guide 50 by a pulley 57 (Fig. 1) rotatably mounted in a holder on the side of a table or bench 59 upon which the machine is supported.

The plate 56 extends beyond the guide 50 and has a semi-cylindrical end portion 58 the central part of which projects toward the left, as viewed in Figs. 2 and 6, to form a nozzle 60 which has an opening 62 therein communicating with a bore 64 in the portion 58, the bore 64 being plugged at its forward end by a screw 66 and being connected at its inner end by a tube 68 and a flexible hose 70 (Fig. 1) to a cement pot or reservoir 72 located at the rear of the machine. The reservoir 72 may be connected in any usual manner to a pressure pump (not shown) and a gage 74 is provided for indicating the pressure in the reservoir. Adhesive, preferably shellac or rubber cement such as latex, is forced constantly from the reservoir into the bore 64 and out through the opening 62 in the nozzle 60. The amount of adhesive or cement supplied at the nozzle 60 may be controlled by a valve 76 (Fig. 1) mounted on the bed 21 and adjustable by a hand wheel 78.

The opening or slot 62 in the nozzle 60 is closed at the top by a straight pin or rod 80 secured therein and extending beyond the slot, as illustrated in Figs. 6 and 7, Fig. 7 being an inverted or bottom plan view of the nozzle and feeding mechanism illustrated in Figs. 4 and 5. As the strips A and B are drawn progressively through the guide by the feed mechanism, the lower strip B passes under the nozzle 60 while the upper strip A passes over the top of the nozzle. As it travels beyond the nozzle and passes over the pin 80, the upper strip A has a fold started in its central or median portion, as illustrated in Fig. 6, into which the nozzle introduces the shellac, cement or other adhesive which is supplied continuously to the nozzle from the reservoir 72, The cement or other adhesive introduced this way between the layers or plies of the fold in the upper strip A will secure these layers firmly together to form a relatively solid two-ply rib when the layers are pressed together in a manner to be presently described.

The strips pass in this condition into a horizontal portion of the folder 40 and past the needles 32, 34 where the fold started in the upper strip A is completed to form an upstanding two-ply rib R resting on the flat lower strip B and where the two strips are then secured permanently together by stitches located at opposite sides of the base of the rib, the strips being drawn progressively and in unison through the guide, folder and stitching mechanism, as indicated above, by the four-motion feed movement of the needles assisted by the feed-dog 42 cooperating with the folder 40, these two latter members moving in synchronized relation with the feeding movement of the needles.

The folder 40, as illustrated in Figs. 2, 4 and 7 to 12, inclusive, comprises a sleeve portion secured to the presser-bar 30 by a clamping screw 82 and having a lower portion 84 extending horizontally under the needles toward the nozzle 60, the portion 84 being shaped as illustrated in Figs. 7, 9, 12 and 13, and comprising a forward extension which is substantially rectangular in shape and is provided with a slot 88 (Fig. 13) extending lengthwise thereof for receiving and completely folding the partialy folded strip A and provided at its bottom surface with a groove 86 (Fig. 13) for receiving and guiding the opposite marginal portions of the strip and maintaining them in a substantially flat horizontal position on the lower strip B. In other words, the folder 40 causes the opposite marginal portions of the upper strip A to project laterally from opposite sides of the rib R and thus form flanges F overlying the lower strip B, as illustrated in Figs. 9 to 11, inclusive.

About midway of its length, the portion 84 of the folder 40 is cut away to provide space for a pair of fingers 90 and 92 (Fig. 9) pivoted on the upper end of the sleeve portion of the folder by screws 94, 96, so that they partake of the four-motion feed movement of the presser-bar 30 and folder. The fingers 90, 92 extend forwardly and downwardly at their lower ends, as illustrated in Fig. 12, into the cut-away portions of the folder and, at their inner or adjacent sides, are shaped as illustrated in Figs. 7 and 8, that is, so that their rib engaging portions, which are complementary to each other, curve out of the substantially rectilinear path of the rib in such a manner as to impart to the rib a substantially S-shaped bend or twist as the rib passes between the fingers, thereby causing the rib to pass between the fingers in an oblique or diagonal direction relatively to the path of movement of the strips, as illustrated in Figs. 7 and 8.

The fingers 90, 92 are normally urged toward each other by a spring 98 extending between pins 100, 102, secured respectively to the fingers 90 and 92, the inward swinging movement of the fingers being limited by stop screws 104, 106 (Figs. 2 and 9) threaded through horizontal arms 108, 110, formed respectively on the fingers 90, 92 and projecting rearwardly or to the left, as viewed in Fig. 2. The stop screws 104, 106 are arranged to engage the sleeve portion of the folder 40, thereby determining the inner positions of the lower ends of the fingers relatively to each other, the fingers being adjustable by means of the stop screws 104, 106 to vary their positions to accommodate ribs of different widths. The fingers 90, 92 are preferably arranged so that they will exert sufficient pressure on the portion of the rib R located between them to twist the rib into an S-shaped curve, as illustrated in Fig. 7. The fingers are confined on the sleeve portion of the folder during their swinging movement by a plate 112 (Fig. 5) secured to the sleeve by a screw 114.

The fingers 90, 92 engage and twist the folded, two-ply rib R of the upper strip A for the following reason. The needles 32, 34 of the sewing machine herein disclosed are not located exactly opposite each other transversely of the rib but, in accordance with the present invention, are positioned so that they are staggered or offset diagonally relatively to the length of the rib a predetermined distance, as illustrated in Fig. 7 and diagrammatically in Fig. 8, the space between the needles obliquely of the rib being approximately equal to the thickness of the thickest part of the rib. In the present case, for example, the two-ply rib R of the upper strip A may be about 50 thousandths of an inch thick at its thickest portion or at the upper end of the rib just after folding while it may be and usually is considerably thinner at another or lower portion, this construction being best illustrated in Fig. 19 which shows the two-ply rib just after it has been folded and stitched to the lower strip B. It is desired, however, to insert the stitches substantially in the creases or angles formed between the base of the rib and the flanges F which project laterally from opposite sides of the rib. In other words, in order to produce the desired rib structure, the stitches should, if possible, be located substantially in the apex of the angle or crease formed between the rib and the flange at each side of the rib. Since the two-ply rib when completed is approximately 50 thousandths of an inch thick, the two rows of stitches will be spaced 50 thousandths of an inch apart if located in these creases. However, the needles in a machine of this type are 50 thousandths of an inch in diameter and, if they were located directly opposite each other transversely of the rib with their points or axes spaced 50 thousandths of an inch apart, the adjacent sides of the needles would touch each other and thus leave no space for the rib to pass between them. Consequently, in order to overcome this difficulty, the needles are staggered or spaced diagonally lengthwise of the rib with the distance between their axes being about 100 thousandths of an inch so that the space between the adjacent sides of the needles obliquely of the rib is about 50 thousandths of an inch. In this way the distance between the axes or points of the needles transversely or widthwise of the rib may be made as great as 100 thousandths of an inch or much smaller as desired depending upon the position of rotation of the cylindrical holder 29 on the needle bar 28 relatively to the path of movement of the rib, the distance between the adjacent sides of the needles, of course, remaining the same, that is, 50 thousandths of an inch. Since the upper portion of the folded rib is usually somewhat thicker than its lower or base portion, at least immediately after folding operation and before the plies of the rib have been pressed firmly together, the needles in the present case are located so that the distance between their axes widthwise of the rib is great enough to permit the needles to descend on either side of the rib without danger of the points of the needles penetrating the thickest portion of the rib which, as stated, is usually the upper portion just after folding. The distance between the axes of the needles transversely of the rib, therefore, is preferably about 75 to 85 thousandths of an inch, as illustrated diagrammatically in Fig. 8 by the broken line X. Accordingly, with this staggered arrangement of the needles it is necessary to twist the rib laterally out of its normal path of movement, as indicated above, to cause the rib to pass obliquely or substantially at right angles through the widest space between the needles or, in other words, to pass between the needles substantially at right angles to a line Y intersecting the axes of the needles.

However, since the distance between the axes or points of the needles transversely of the rib is still greater than desired, that is, since, as illustrated by the line X in Fig. 8, this distance is 75 to 85 thousandths of an inch whereas the distance between the angles or creases at the base of the rib is only about 50 thousandths of an inch, it is necessary to move the points of the needles closer together widthwise of the rib before the stitches are actually inserted in order to eliminate the 25 to 35 thousandths of an inch extra space allowed to insure that the needles will straddle and pass by the thickest portion of the rib during their movement toward the work. This is accomplished in the following manner.

The fingers 90, 92 are provided respectively with semi-circular grooves 116, 118 (Figs. 2, 7, and 10) which are the same diameter as the needles and are inclined inwardly from the top to the bottom of the fingers a distance of 12 to 18 thousandths of an inch, these inwardly inclined grooves forming, in effect, cam surfaces which engage the needles as the latter descend and bend or deflect the needles inwardly toward each other before they engage the work, the deflection of each needle, as indicated above, being in the vicinity of 12 to 18 thousandths of an inch so that their combined deflection is from 24 to 36 thousandths of an inch, or approximately the amount over 50 thousandths of an inch that the axes of the needles are spaced apart widthwise of the rib when the needles are in their raised position, that is to say, between 75 and 85 thousandths of an inch widthwise of the rib. Figs. 7 and 8 illustrate in plan view and diagrammatically the positions of the grooves and the deflection of the needles before they enter the work, Fig. 8, in particular, showing how the fingers 90, 92 twist the rib and how the points of the needles avoid engaging the thicker portion of the rib by being deflected inwardly before they enter the work thereby to position the points of the needles, and consequently the stitches, indicated in Fig. 19 by the letter S, precisely in the apexes of the creases or angles C formed between the two-ply rib R and the oppositely extending flanges F, the stitches S being spaced apart approximately 50 thousandths of an inch. Figs. 9 to 12, inclusive, illustrate different stages in the operation of the needles and show how they are deflected widthwise of the rib so that, while they will avoid striking the thickest part of the rib, they will nevertheless enter the work in the angles or creases referred to. Fig. 10 shows the needles just after they have passed through the work, and Figs. 11 and 12 illustrate the positions of the mechanisms and work pieces after the needles have completed their stroke and are about to be withdrawn from the work.

It is desirable, after the needles have passed through the work, to separate the fingers 90, 92 from the inner positions illustrated in Fig. 10 into an open or retracted position in order to release the rib R and also to relieve further pressure on the needles while they are completing the stitch and are being withdrawn from the work preparatory to inserting the next stitch. In other words, after the points of the needles have passed through the work in the creases C between the rib and the flanges F at opposite sides of the rib and are located about 50 thousandths of an inch apart widthwise of the rib, there is no longer any reason for having the fingers 90, 92 continue to grip and twist the rib or for permitting the grooves 116, 118 to exert further pressure on the needles, in fact, such pressure and gripping action at this time tend to hinder rather than facilitate the stitching operation. Accordingly, means is provided for automatically separating the fingers 90, 92 into their open or retracted positions after the needles have passed through the work.

The separating means, as herein illustrated, comprises a pair of rigid arms 120, 122 (Figs. 4 and 5) secured respectively by screws 124, 126 to projections formed on a carrier member 128 and straddling the sleeve portion of the folder 40, the carrier member being fastened by a clamping screw 130 to the needle bar 28. The lower portions of the arms 120, 122 taper, as shown in Figs. 5 and 9, and are arranged to engage cam surfaces 132, 134 (Fig. 10) formed respectively on the inner sides of the horizontal arms 108, 110 of the fingers 90, 92 so that, as the needle bar and needles descend to insert a stitch at each side of the rib, the rigid arms 120, 122 will engage the surfaces 132, 134 and cam the fingers 90, 92 away from each other about their pivots 94, 96, thereby separating the fingers against the action of the spring 98 to release the rib and remove the fingers and grooves 116, 118 from engagement with the needles. Although the action is extremely rapid the arrangement is such that the separation of the fingers 90, 92 takes place at substantially the same time that the points of the needles pass through the work, the opening movement of the fingers being sufficient to free the rib and needles entirely from the fingers, as illustrated in Fig. 11. After the needles have completed their downward stroke, they move laterally a predetermined distance in the direction of movement of the strips or toward the left, as viewed in Fig. 12, to feed or draw the strips in unison through the guide and sewing machine in accordance with the normal operation of the four-motion feed movement of the needles and the auxiliary feeding mechanisms of the machine associated therewith. As explained above, the presser-bar 30 and the folder 40, 84 partake of this four-motion movement of the needles as to the rigid arms 120, 122 carried by the needle bar 28. Moreover, the feed-dog 42 (Figs. 11 and 12) also moves in the direction of feed with the needles and, after the needles have been retracted from the work at the end of their feeding movement, all the feed mechanisms of the machine move in an opposite direction to return the parts into their initial position for inserting the next stitch. As the needles are withdrawn from the work, the rigid arms 120, 122 leave the cam surfaces 132, 134 on the horizontal arms 108, 110 and permit the fingers 90, 92 to move inwardly again under the action of the spring 98 to engage and twist the next portion of the rib and to locate the grooves 116, 118 in position to deflect the needles on their next downward movement, thereby repeating the entire operation as each stitch is inserted. As pointed out above, the folder 40, 84 does not descend far enough in the present construction actually to press against the work so that the strips A and B are not gripped between the folder and the feed-dog 42 but are merely confined by them to a limited degree. Accordingly, the needles are assisted in feeding the strips only by the feed-dog 42 which engages the bottom surface of the lower strip B and exerts some friction thereon. In this way, the upper strip A is relatively free to be acted upon by the folder 40, 84 and the fingers 90, 92 while they are forming the rib R and flanges F and while the stitches are being inserted, the upper strip being confined, however, by the folder during the actual feeding operation.

After the stitches have been inserted in the creases C at opposite sides of the rib, as illustrated in Fig. 19, the strips A and B pass from the stitching mechanism into a second folder 136 (Figs. 2 and 17) mounted on the bed 21 and constructed and arranged to turn the two flanges F of the upper strip A upwardly against the two-ply rib R to enclose the rib while maintaining the lower strip B in a substantially flat position, the folder 136 also operating to bend the rib and upturned flanges into an inclined position relatively to the lower strip. As illustrated in Figs. 2, 17 and 18, the folder 136 comprises a plate provided with a slot 138 for guiding the lower strip B. About midway of its length, the plate 136 has adjustably mounted thereon a pair of folding members 140, 142 which are shaped and arranged to separate the flanges F from their engagement with the lower strip B and to turn them upwardly progressively against the opposite sides of the rib R and also to bend the rib and upturned flanges into an inclined position which, as illustrated in Figs. 18 and 20, is approximately 30° to the vertical or about 60° to the plane of the lower or base strip B. The folding members 140, 142 are adjustably secured to the plate 136 by slot and screw arrangements 144 and the folding member 140 is provided with an adjusting screw 146 whereby it may be adjusted relatively to the opposite member 142. The lower strip B travels in the guideway 138 under the folding members while the flanges F of the upper strip A are separated progressively from the lower strip and turned upwardly against the rib R by the folding members as described above, a stationary arm 148 being provided forwardly of the member 142 to assist in the folding operation. Mounted beyond or to the left of the folding members, as viewed in Figs. 2 and 17, is a pair of thin plates 150, 152 which overlap the guideway 138 and maintain the lower strip in a proper position therein after the strips have been operated upon by the folding members. Fig. 18 illustrates on an enlarged scale the shapes of the folding members 140, 142 on the line 18—18 of Fig. 17 and shows how the flanges F of the strip A are turned upwardly against the rib R to enclose the rib completely, this figure also showing how the rib and flanges are bent into an inclined position relatively to the lower strip B before the strips leave the folding members.

After being folded in the manner described, the strips pass forwardly and the rib R and flanges F are engaged between a pair of rib-shaping and setting rolls 154, 156 which are adapted to press the flanges forcibly against the rib to shape and complete the rib and also to position or set it permanently at the inclined angle into which it was bent by the folding members 140, 142. As illustrated in Fig. 16, the rolls 154, 156 are shaped to force the flanges F firmly against the two-ply rib R and against each other beyond the rib and thereby cause the flanges to adhere to the rib and to each other by reason of the pressure-responsive cement on the outer or exposed surfaces of the rib and flanges, as explained above, the cement being indicated in Figs. 19 and 20 by the letter P. The completed ribbed strip, as illustrated in Fig. 20, comprises a four-ply rib portion made up of the two-ply rib R enclosed by the two flanges F, and a two-ply upper portion T composed of the outer margins of the flanges. The multi-ply rib will be inclined inwardly at an angle of about 30° to the vertical and the base portion of the ribbed strip, formed by the lower strip B, will provide an outer flange O, somewhat narrower than the height of the rib, and a relatively wide inner flange I which is considerably wider than the outer flange or, as illustrated in Figs. 18 and 20, is approximately twice as wide as the height of the rib. The inner side of the four-ply rib is substantially straight whereas the outer side has a slight depression at its upper end where the outer flange F has been forced over the top of the two-ply rib R into engagement with the inner flange F. The lower surface of the lower strip B of the completed ribbed strip is coated with pressure-responsive cement P whereby the completed strip may be permanently attached to the outer surface of an insole which has preferably been coated with the same kind of cement.

The rib shaping and setting rolls 154, 156 are rotated intermittently equal amounts in opposite directions, which movements are synchronized to occur with the feeding movements of the needles and other feed mechanisms referred to above. The roll 154 is shaped as shown in Fig. 16 in order to force the outer flange F firmly against the inner flange above the two-ply rib, the roll 156 being substantially frusto-conical in shape with a flat rib engaging surface inclined at an angle of substantially 30° to the vertical. The roll 156 is knurled whereas the roll 154 is smooth on its rib-engaging surface and the rolls are positioned sufficiently close together to exert substantial pressure upon the rib and flanges to effect the shaping of the rib and to set the rib permanently at the desired angle. The knurled roll 156 creates sufficient friction between the rib and rolls to assist in drawing the strips through the folding members 140, 142, but, since the rolls are not of equal diameters, the surface of the roll 154 is left smooth to avoid an unequal frictional pull on the strips as they are drawn through the folding members.

The mechanism for rotating the rolls intermittently in synchronized relation with the feeding movements of the needles, folder 40, 84 and feed-dog 42, is illustrated in Figs. 1, 14 and 15. The roll 154 is secured to the lower end of a vertical shaft 158 which is rotatably mounted in a casting 160 supported adjacent to the head 26 by a bracket 162 fastened to the bed 21. The roll 156 is mounted on the lower end of a shaft 164 rotatably mounted in the casting 160 and the two shafts are geared together for equal and opposite movement, as illustrated in Fig. 15, by gears 166, 168 secured respectively to the shafts 158 and 164. The shaft 164 projects upwardly beyond the casting 160 and is provided on its upper end with a Horton clutch device 170 of well-known construction which, in turn, is connected by a universal joint 172 and a rod 174 to a second universal joint 176 (Fig. 1) provided on the outer end of an arm 178 of a bell-crank lever 180 rotatably mounted on a pin 181 fastened in a bracket 182 secured to the standard 22. The other arm 184 of the bell-crank lever is connected by universal joints 186 and 187 and a connecting rod 188 to a lever 190 pivoted on a stud 192 secured in the standard 22, the upper end of the lever 190 being bifurcated and straddling an eccentric 194 mounted on the horizontal shaft 36. Rotation of the shaft 36 in a counterclockwise direction, as viewed in Fig. 1, by the pulley 38 oscillates the lever 190 which, through the connections already described, causes the Horton clutch 170 to rotate the shaft 164 intermittently in one direction to cause the rolls 154, 156 to be rotated by the gears 166, 168 in opposite directions and thereby to draw the strips progressively through the folding member 136 and between the rolls, thereby completing the formation of the composite ribbed strip.

The completed ribbed strip may be applied directly to an insole as it leaves the present machine or, if desired, it may be conducted from the shaping rolls 154, 156 by suitable guiding means to a spool or reel (not shown) upon which it may be wound until such time as it is to be applied to insoles to provide sewing ribs thereon, for example, during the manufacture of the insoles.

Having thus described our invention, what we claim as new and desire to secure by Letters Patent of the United States is:

1. A machine for use in making ribbed strips adapted for attachment to insoles to provide sewing ribs thereon having, in combination, a single guide for positioning a plurality of strips in superimposed relation to each other and in predetermined transverse positions, mechanism for drawing the strips through the guide, means for folding one of said strips after it leaves the guide to form a rib with respect to another strip, and means for securing said strips together after the rib has been formed.

2. A machine for use in making ribbed strips adapted for attachment to insoles to provide sewing ribs thereon having, in combination, a single guide for positioning a pair of strips in superimposed predetermined widthwise relation to each other, mechanism for drawing the strips progressively through the guide, means for folding the upper strip after it leaves the guide to form an upstanding rib relatively to the lower strip, and means for securing the strips permanently together after the rib has been formed.

3. A machine for use in making ribbed strips adapted for attachment to insoles to provide sewing ribs thereon having, in combination, a stationary guide provided with horizontal guideways for positioning a pair of strips in superimposed position and in predetermined transverse relation to each other, mechanism for drawing the strips progressively through the guide, means for folding one of said strips upon itself to form a two-ply rib with respect to the other strip, and means for stitching the strips together after the rib has been fully formed.

4. A machine for use in making ribbed strips adapted for attachment to insoles to provide sewing ribs thereon having, in combination, a guide for positioning a pair of strips in superimposed relation to each other, mechanism for drawing the strips through the guide, means for folding the upper strip medially as it is drawn from the guide to form a rib on the lower strip, means for securing the strips permanently together, and means for bending the rib at an angle to said lower strip.

5. A machine for use in making ribbed strips adapted for attachment to insoles to provide sewing ribs thereon having, in combination, a guide for positioning a pair of strips in superimposed relation to each other, mechanism for advancing the strips progressively through the guide, means for folding the upper strip to form a rib resting on the lower strip, means for securing the strips together along opposite sides of the rib, means for bending the rib to position it at an inclined angle relatively to the lower strip, and means for setting the rib permanently at such angle.

6. A machine for use in making ribbed strips adapted for attachment to insoles to provide sewing ribs thereon having, in combination, a guide for positioning a pair of flat strips in superimposed relation to each other, mechanism for drawing the strips in unison through the guide, means for folding one of said strips to form a rib upon the other strip with flanges at opposite sides of the rib overlapping said other strip, means for securing the strips permanently together, and means for turning up the flanges to enclose said rib.

7. A machine for use in making ribbed strips adapted for attachment to insoles to provide sewing ribs thereon having, in combination, a guide for positioning a pair of strips in superimposed relation to each other, mechanism for drawing the strips progressively through the guide, means for folding the upper strip to form a rib on the lower strip with flanges projecting laterally from opposite sides of the rib, means for inserting stitches through the strips at opposite sides of the rib, and means for turning up the flanges along the lines of stitching to enclose said rib.

8. A machine for use in making ribbed strips adapted for attachment to insoles to provide sewing ribs thereon having, in combination, a guide for positioning a pair of strips in superimposed relation to each other, said strips being coated on their exposed surfaces with pressure-responsive cement, mechanism for drawing the strips in unison through the guide, means for folding one of said strips to form a rib on the other strip with flanges projecting laterally from opposite sides of the rib and engaging said other strip, means for securing the strips together along opposite sides of the rib adjacent to its base, a folder for turning said flanges upwardly against the opposite sides of the rib, and means for exerting pressure against the rib and flanges to cause said flanges to adhere to the rib and to each other beyond the rib by reason of said pressure-responsive cement, thereby completely enclosing said rib.

9. A machine for use in making ribbed strips adapted for attachment to insoles to provide sewing ribs thereon having, in combination, a guide for positioning a pair of flat strips in superimposed relation to each other, said strips being coated on the surfaces thereof which are outwardly disposed from each other with pressure-responsive cement, mechanism for drawing the strips progressively through the guide, means for folding the median portion of the upper strip upon itself widthwise to form a rib on the lower strip with flanges projecting laterally from the opposite sides of said rib and overlying said lower strip, means for inserting stitches along opposite sides of the base of the rib to secure the two strips together, a folder for turning said flanges upwardly along the lines of stitching against the opposite sides of the rib, and means for pressing the flanges progressively against said opposite sides and against each other beyond the rib to cause the flanges to adhere to the rib and to each other beyond the rib by reason of the pressure-responsive cement thereon, thereby completely enclosing the rib to form a multi-ply sewing rib on the lower strip.

10. A machine for use in making ribbed strips adapted for attachment to insoles to provide sewing ribs thereon having, in combination, a guide for positioning a pair of flat strips in superimposed relation to each other and in predetermined widthwise positions, said strips having pressure-responsive cement on their outer surfaces, mechanism for drawing the strips progressively through the guide, means for folding the upper strip widthwise upon itself after the strips leave the guide to form a two-ply rib on the lower strip with flanges extending laterally from each side of the base of the rib and overlying said lower strip, means for inserting stitches through the strips along each side of the rib, said stitches being located substantially in the creases formed between rib and flanges, a folder for turning the flanges upwardly against the rib, and rolls for pressing the flanges progressively against the rib and against each other beyond the rib, thereby causing the flanges to adhere to the rib and to each other by reason of said pressure-responsive cement, thereby completely enclosing the rib and providing a four-ply rib upon the lower strip, said lower strip serving as a base for the rib, said pressing rolls acting also to bend the rib into a permanently inclined position relatively to said base.

11. A machine for use in making ribbed strips adapted for attachment to insoles to provide sewing ribs thereon having, in combination, a guide for positioning a pair of substantially flat strips in superimposed relation to each other, said strips being coated on their outwardly facing surfaces with pressure-responsive cement, mechanism for drawing the strips intermittently through said guide, means for folding the top strip to form a rib on the bottom strip with flanges projecting laterally from the opposite sides of the rib and overlapping said bottom strip, means for inserting stitches through the strips at the opposite sides of the base of the rib, a folder for turning said flanges upwardly against the rib, and means for pressing the flanges progressively against the rib and against each other above the rib, thereby causing the flanges to adhere to the rib and to each other by reason of the cement thereon to enclose the rib, said pressing means acting also to draw the strips intermittently through the folder.

12. A machine for use in making ribbed strips adapted for attachment to insoles to provide sewing ribs thereon having, in combination, a guide for positioning a pair of strips in superimposed relation to each other, mechanism for advancing the strips through the guide, means for folding one of said strips to form a rib with respect to the other strip, and means for introducing material into the fold in the folded strip.

13. A machine for use in making ribbed strips adapted for attachment to insoles to provide sewing ribs thereon having, in combination, a guide for positioning a pair of strips in superimposed relation to each other, mechanism for moving the strips progressively through the guide, means for folding one of said strips to form a multi-ply rib relatively to the other strip, and means for introducing material between the plies of said rib to maintain the rib in its folded shape.

14. A machine for use in making ribbed strips adapted for attachment to insoles to provide sewing ribs thereon having, in combination, a guide for positioning a pair of strips in superimposed relation to each other, mechanism for moving the strips progressively through the guide, means for folding one of said strips to form a two-ply rib on the other strip, and means for introducing adhesive between the plies of said rib to secure said plies permanently together.

15. A machine for use in making ribbed strips adapted for attachment to insoles to provide sewing ribs thereon having, in combination, a guide for positioning a pair of relatively flat strips in superimposed relation to each other, mechanism for moving the strips progressively through the guide, means for folding the upper strip during such movement to form thereon a two-ply rib with respect to the lower strip, and continuously operating means for injecting cement between the plies of said rib as the upper strip is being folded.

16. A machine for use in making ribbed strips adapted for attachment to insoles to provide sewing ribs thereon having, in combination, a guide for positioning a pair of relatively flat strips in superimposed relation to each other, mechanism for drawing the strips through the guide, means for folding one of said strips to form a two-ply rib upon the other strip, means for injecting adhesive between the plies forming the rib, and means for pressing said plies together to cause the adhesive to bond them permanently to each other.

17. A machine for use in making ribbed strips adapted for attachment to insoles to provide sewing ribs thereon having, in combination, a guide for positioning a pair of strips in superimposed relation to each other, mechanism for drawing the strips through the guide, means for folding one of said strips to form a rib upon the other strip, means for injecting adhesive into the fold forming the rib, and means for securing the strips together after the adhesive has been introduced.

18. A machine for use in making ribbed strips adapted for attachment to insoles to provide sewing ribs thereon having, in combination, a guide for positioning a pair of flat strips in superimposed relation to each other, mechanism for drawing the strips progressively through the guide, means for folding the upper strip to form a rib with flanges projecting laterally from opposite sides thereof, means for injecting cement into the fold forming the rib substantially as the strip is folded, and means for thereafter stitching the two strips together at each side of the base of the rib.

19. A machine for use in making ribbed strips adapted for attachment to insoles to provide sewing ribs thereon having, in combination, a guide for positioning a pair of strips in superimposed relation to each other, means for folding the upper strip progressively to form a rib upon the lower strip, means for introducing cement into the fold of the upper strip as it is being folded, and means for securing the strips together at opposite sides of the rib and for feeding the strips in unison.

20. A machine for use in making ribbed strips adapted for attachment to insoles to provide sewing ribs thereon having, in combination, a guide for positioning a pair of substantially flat strips in superimposed relation to each other, means for folding one of said strips upon itself to form a two-ply rib upon the other strip, means for introducing cement between the plies of said rib as it is being folded, and means for drawing the strips progressively through the guide, folding and cementing means.

21. A machine for use in making ribbed strips adapted for attachment to insoles to provide sewing ribs thereon having, in combination, a guide for positioning a pair of strips in superimposed relation to each other, mechanism for drawing the strips progressively through the guide, means for folding one of said strips widthwise to form a two-ply rib on the other strip, pressure-operated means for injecting adhesive progressively between the plies of the rib as it is folded, means for securing the two strips together after the adhesive has been introduced, and means for pressing said plies together to shape the rib and to cause said adhesive to bond the plies permanently together.

22. A machine for use in making ribbed strips adapted for attachment to insoles to provide sewing ribs thereon having, in combination, guiding means for positioning a pair of strips in superimposed relation to each other, means for folding the upper strip to form a rib on the lower strip with flanges extending laterally from opposite sides of the rib and overlapping said lower strip, means for introducing cement into the fold forming the rib, and means for inserting stitches through the strips at each side of the base of the rib and for drawing the strips progressively through the guiding, folding and cementing means.

23. A machine for use in making ribbed strips adapted for attachment to insoles to provide sewing ribs thereon having, in combination, a guide for positioning a pair of flat strips in superimposed relation to each other, mechanism for drawing the strips progressively through the guide, means for folding the upper strip upon itself widthwise to form a two-ply rib on the lower strip, continuously operating means for injecting cement progressively into the fold of the upper strip while it is being folded to form the rib, means for stitching the two strips together after the cement has been introduced, and rotary means for pressing the rib progressively to shape the rib.

24. A machine for use in making ribbed strips adapted for attachment to insoles to provide sewing ribs thereon having, in combination, a guide for positioning a pair of flat strips in superimposed relation to each other, mechanism for drawing the strips progressively through the guide, means for folding the upper strip widthwise to form a two-ply rib on the lower strip with flanges extending laterally from opposite sides of the base of the rib and overlying the lower strip, means for introducing cement progressively between the plies of said rib for securing said plies together, needles for inserting stitches through the strips at opposite sides of the rib, means for turning the flanges upwardly against the opposite sides of the rib, and means for applying pressure progressively to said flanges to secure them permanently in such position.

25. A machine for use in making ribbed strips adapted for attachment to insoles to provide sewing ribs thereon having, in combination, a guide for positioning a pair of strips in superimposed relation to each other, mechanism for drawing the strips through the guide, means for folding one of said strips to form a rib on the other strip having a base portion thinner than its upper portion and having flanges projecting laterally from opposite sides of said base portion, means for inserting fastenings through the strips at opposite sides of the base portion of said rib, and means separate from said fastening inserting means for causing the fastening inserting means to locate the fastenings substantially in the creases formed between the flanges and the base portion of the rib, irrespective of the thickness of the upper portion of said rid.

26. A machine for use in making ribbed strips adapted for attachment to insoles to provide sewing ribs thereon having, in combination, a guide for positioning a pair of substantially flat strips in superimposed relation to each other, mechanism for drawing the strips progressively through the guide, means for folding the upper strip to form a rib on the lower strip having a base portion narrower than its upper portion and having flanges extending laterally from opposite sides of the rib and overlying said lower strip, means for inserting stitches through the strips at opposite sides of the rib, and means cooperating with the stitching means for causing the latter to locate the stitches substantially in the creases formed between the narrow base of the rib and the laterally extending flanges irrespective of the thickness of the upper portion of the rib.

27. A machine for use in making ribbed strips adapted for attachment to insoles to provide sewing ribs thereon having, in combination, a guide for presenting to the machine a pair of flat strips located in superimposed relation to each other, mechanism for drawing the strips progressively through the guide, means for folding the mid-portion of the upper strip upon itself widthwise to form a two-ply rib on the lower strip with flanges extending laterally from opposite sides of the rib, needles for inserting stitches through the strips at opposite sides of the rib, said needles normally operating in substantially vertical paths, means for operating said needles, and means for deflecting said needles out of said paths to cause them to locate the stitches substantially in the creases formed between the base of the rib and said flanges.

28. A machine for use in making ribbed strips adapted for attachment to insoles to provide sewing ribs thereon having, in combination, a guide for positioning a pair of strips in superimposed relation to each other, mechanism for drawing the strips through the guide, means for folding one of said strips to form a rib upon the other strip, a pair of needles for inserting stitches through both strips at opposite sides of the rib, said needles being offset diagonally lengthwise of the rib, and means for twisting the rib as it passes the needles to cause it to pass between them substantially at right angles to a line intersecting the axes of said needles.

29. A machine for use in making ribbed strips adapted for attachment to insoles to provide sewing ribs thereon having, in combination, a guide for positioning a pair of flat strips in superimposed relation to each other, mechanism for drawing the strips progressively through the guide, means for folding the upper strip upon itself to form a rib on the lower strip with flanges extending from opposite sides of the rib and overlapping said lower strip, a pair of needles for inserting stitches through the strips at opposite sides of the rib, said needles being located at different points lengthwise of the rib with the space between the needles substantially equal to the thickness of the rib, and means for twisting the rib as it reaches the needles to cause it to pass by the needles in a path substantially at right angles to a line intersecting the axes of said needles.

30. A machine for use in making ribbed strips adapted for attachment to insoles to provide sewing ribs thereon having, in combination, a guide for positioning a pair of flat strips in superimposed relation to each other, mechanism for drawing the strips progressively through the guide, means for folding the upper strip widthwise to form a rib on the lower strip, a pair of needles for inserting stitches through the strips at opposite sides of the rib, said needles being spaced apart diagonally lengthwise of the rib a distance at least equal to the thickest part of the rib, means for twisting the rib as it approaches the needles to cause it to move past the needles in a path extending substantially at right angles to the plane of the needles, and means for moving said twisting means toward and away from the rib.

31. A machine for use in making ribbed strips adapted for attachment to insoles to provide sewing ribs thereon having, in combination, a guide for positioning a pair of flat strips in superimposed relation to each other, mechanism for drawing the strips progressively through the guide, means for folding the upper strip to form a two-ply rib on the lower strip with flanges projecting laterally from opposite sides of the rib, a pair of needles for inserting stitches through the strips at opposite sides of the rib, said needles being spaced diagonally from each other relatively to the rib, the space between the needles obliquely of the rib being at least equal to the thickness of the rib but the space between the needles widthwise of the rib being less than the thickness of said rib, means movable into and out of operative position relatively to the rib for twisting said rib as it reaches the needles to cause it to pass by the needles substantially at right angles to a line intersecting the axes of said needles, and means for moving said twisting means away from operative position after the needles have entered the work.

32. A machine for use in making ribbed strips adapted for attachment to insoles to provide sewing ribs thereon having, in combination, a guide for positioning a pair of strips in superimposed relation to each other, mechanism for drawing the strips through the guide, means for folding the upper strip progressively to form a rib on the lower strip, a pair of needles for inserting stitches through the strips at opposite sides of the rib, said needles being spaced apart diagonally lengthwise of the rib a distance approximately equal to the thickest part of the rib but being spaced apart transversely of the rib a distance less than the thickness of the rib, means for twisting the rib to cause it to pass under the needles substantially at right angles to the plane of said needles, said means being movable into and out of operative position, and means for moving said twisting means into and out of operative position in timed relation with the operation of said needles.

33. A machine for use in making ribbed strips adapted for attachment to insoles to provide sewing ribs thereon having, in combination, a guide for positioning a pair of flat strips in superimposed relation to each other, mechanism for drawing the strips progressively through the guide, means for folding the upper strip to form a rib on the lower strip, a pair of needles for inserting stitches through the strips at opposite sides of the rib, said needles being spaced apart diagonally lengthwise of the rib a distance at least equal to the thickness of the rib but being spaced apart widthwise of the rib a distance less than the thickness of the rib, means movable into and out of operative position for twisting the rib lengthwise to cause it to pass obliquely under the needles substantially at right angles to a line intersecting their axes, thereby permitting the needles to straddle the thickest part of the rib, and means operable with the needles for moving the twisting means out of operative position after the needles have entered the work.

34. A machine for use in making ribbed strips adapted for attachment to insoles to provide sewing ribs thereon having, in combination, a guide for positioning a pair of strips in superimposed relation to each other, mechanism for drawing the strips intermittently through the guide, means for folding the upper strip widthwise to form a rib on the lower strip, a pair of needles for inserting stitches through the strips at opposite sides of the rib, said needles being offset diagonally lengthwise of the rib so that the distance between them is at least equal to the thickest part of the rib, the distance between the needles widthwise of the rib being less than the thickness of the rib, pivoted members movable into and out of operative position for engaging the rib and twisting it as it passes the needles to cause the rib to pass obliquely by the needles, thereby permitting the needles to straddle the rib, resilient means normally urging said pivoted members into operative position, and means for moving the pivoted members out of operative position against the action of said resilient means as the needles enter the work, said last-named means maintaining the pivoted members out of operative position until the needles have been retracted from the work.

35. A machine for use in making ribbed strips adapted for attachment to insoles to provide sewing ribs thereon having, in combination, a guide for positioning a pair of flat strips in superimposed relation to each other, mechanism for drawing the strips through the guide, means for folding one of said strips to form a rib on the other strip with flanges extending laterally from opposite sides of the rib, a pair of needles for inserting stitches through the strips at opposite sides of the rib, said needles being offset diagonally lengthwise of the rib and moving in rectilinear paths, means for gripping and twisting the rib as it passes the needles to cause the rib to pass under the needles substantially at right angles to a line intersecting the axes of said needles, and means acting to deflect the needles from their rectilinear path to cause them to enter the strips substantially in the creases formed between the rib and flanges, thereby locating the stitches in said creases.

36. A machine for use in making ribbed strips adapted for attachment to insoles to provide sewing ribs thereon having, in combination, a guide for positioning a pair of flat strips in superimposed relation to each other, mechanism for drawing the strips through the guide, means for folding one of said strips to form a rib on the other strip with flanges extending laterally from opposite sides of the base of the rib, a pair of needles for inserting stitches through the strips at opposite sides of the rib, said needles being offset diagonally lengthwise of the rib and operating in rectilinear paths, means movable to and from operative position for twisting the rib obliquely and causing it to pass by the needles substantially at right angles to the line of separation between the needles, thereby permitting the rib to pass between the needles, said means operating also to deflect said needles toward each other before they enter the work to cause the needles to enter the strips substantially in the creases formed between the rib and flanges, thereby locating the stitches in said creases, and means operating in timed relation to said needles for moving the twisting and deflecting means out of operative position after the needles have entered the work.

37. A machine for use in making ribbed strips adapted for attachment to insoles to provide sewing ribs thereon having, in combination, a guide for positioning a pair of flat strips in superimposed relation to each other, mechanism for drawing the strips progressively through the guide, means for folding the upper strip to form a rib on the lower strip with flanges extending laterally from opposite sides of the base of the rib, a pair of needles for inserting stitches through the strips at opposite sides of said base, said needles being offset diagonally lengthwise of the rib and operating in rectilinear paths, the space between said needles obliquely of the rib being at least equal to the thickest part of the rib, pivoted members for twisting the rib to cause it to pass obliquely under the needles substantially at right angles to the plane thereof, said pivoted members being provided with grooves operating to deflect the needles inwardly toward the rib to cause them to enter the strips substantially in the creases formed between the rib and flanges, cam surfaces on said pivoted members, a spring normally urging said members into operative position, and means for engaging said cam surfaces and moving the pivoted members out of operative position after the needles have passed through the strips.

38. That improvement in methods of making ribbed strips adapted for attachment to insoles to provide sewing ribs thereon which comprises positioning a pair of strips in superimposed relation to each other and in predetermined widthwise positions, folding one of said strips progressively to form a two-ply rib with respect to the other strip, introducing adhesive material between the plies of said rib during the folding operation for securing said plies together, and pressing said plies together with the aid of rolls to secure them directly to each other.

39. That improvement in methods of making ribbed strips adapted for attachment to insoles to provide sewing ribs thereon which comprises positioning a pair of initially flat strips in superimposed predetermined transverse relation to each other, folding one of said strips progressively to form a two-ply rib with respect to the other strip, introducing adhesive between the plies of said rib while holding said plies in their folded position, and pressing said plies directly against each other to secure them permanently in such position.

40. That improvement in methods of making ribbed strips adapted for attachment to insoles to provide sewing ribs thereon which comprises positioning a pair of strips in superimposed relation to each other, moving said strips intermittently in unison in a predetermined rectilinear path, folding the top strip progressively during such movement to form a two-ply rib resting on the bottom strip, introducing adhesive material progressively between the plies of said rib during said movement for maintaining said plies in their folded position, and pressing the plies together progressively during said movement to cause them to adhere directly to one another.

41. That improvement in methods of making ribbed strips adapted for attachment to insoles to provide sewing ribs thereon which comprises positioning a pair of strips in superimposed relation to each other, folding one of said strips relatively to the other while moving said strips in a predetermined path to form a rib having a base portion thinner than its upper portion, and securing said strips together closely adjacent to both sides of said thinner base portion during such movement without interfering with the thicker upper portion of the rib.

42. That improvement in methods of making ribbed strips adapted for attachment to insoles to provide sewing ribs thereon which comprises positioning a pair of substantially flat strips in superimposed relation to each other, moving said strips in unison in a predetermined path, folding one of said strips progressively during such movement relatively to the other strip to form a two-ply rib having a thick upper portion and a thinner base portion, and stitching the strips together simultaneously close to the opposite sides of said thinner base portion of the rib without affecting the thick upper portion of said rib.

43. That improvement in methods of making ribbed strips adapted for attachment to insoles to provide sewing ribs thereon which comprises positioning a pair of strips in superimposed relation to each other, folding the upper strip upon the lower strip while moving said strips in a rectilinear path to form an upstanding two-ply rib having a thin base portion and a thicker upper portion, securing the strips together simultaneously closely adjacent to the opposite sides of said thin base portion during their movement in said path without interfering with said thicker upper portion, and bending the two-ply rib sideways to position it at an inclined angle relatively to said other strip after said strips have been secured together.

44. That improvement in methods of making ribbed strips adapted for attachment to insoles to provide sewing ribs thereon which comprises positioning a pair of substantially flat strips in superimposed relation to each other, folding the upper strip upon itself widthwise to form an upstanding rib on the lower strip while moving the strips in unison in a rectilinear path, securing the strips together during such movement adjacent to the base of the rib, bending the rib sideways to position it at an inclined angle to the lower strip, and applying pressure to the rib to set it permanently at said angle.

45. That improvement in methods of making ribbed strips adapted for attachment to insoles to provide sewing ribs thereon which comprises locating a pair of flat strips in superimposed relation to each other, moving the strips in unison in a predetermined path, folding one of said strips upon itself widthwise during such movement to form an upstanding rib on the other strip, stitching the strips together at opposite sides of the rib, bending the rib at an acute angle to said other strip as the strips move along said path, and applying pressure progressively to the rib to position it permanently at such angle.

46. That improvement in methods of making ribbed strips adapted for attachment to insoles to provide sewing ribs thereon which comprises positioning a pair of strips in superimposed relation to each other, moving the strips intermittently in a rectilinear path, folding the upper strip progressively during such movement to form a two-ply rib on the lower strip with flanges extending laterally from opposite sides of the rib and overlying said lower strip, securing the strips together progressively along opposite sides of the rib by stitches located substantially in the apexes of the angles formed between the rib and said flanges, and folding the flanges upwardly along said stitches to enclose the two-ply rib.

47. That improvement in methods of making ribbed strips adapted for attachment to insoles to provide sewing ribs thereon which comprises positioning a pair of substantially flat strips in superimposed relation to each other, moving the strips in unison in a rectilinear path, folding the upper strip progressively during such movement to form a two-ply rib on the lower strip with flanges extending laterally from the base of said rib and overlapping said lower strip, stitching the strips together progressively along opposite sides of the base of the rib with the stitches located substantially in the creases formed between said rib and flanges, folding the flanges upwardly against the two-ply rib during the movement of the strips to enclose said rib and form a four-ply rib, and bending the four-ply rib progressively into an inclined angle relatively to the lower strip, thereby setting the rib permanently at said angle and completing the formation of the ribbed strip.

48. That improvement in methods of making ribbed strips adapted for attachment to insoles to provide sewing ribs thereon which comprises positioning a pair of strips in superimposed relation to each other, folding one of said strips to form a two-ply rib on the other strip, introducing adhesive between the plies of said rib to secure said plies together, and attaching the two strips together along opposite sides of the base of said rib after the adhesive has been introduced.

49. That improvement in methods of making ribbed strips adapted for attachment to insoles to provide sewing ribs thereon which comprises positioning a pair of strips in superimposed relation to each other, moving said strips in unison in a predetermined path, folding one of said strips progressively during such movement to form a two-ply rib on the other strip, injecting cement between the plies of said rib as the strip is being folded, securing the two strips together progressively along opposite sides of the base of the rib, and applying pressure progressively to the rib as the strips move in said path to cause said plies to become bonded together by reason of the cement injected between the plies.

50. That improvement in methods of making ribbed strips adapted for attachment to insoles to provide sewing ribs thereon which comprises positioning a pair of strips in superimposed relation to each other, moving the strips in unison in a predetermined path, folding one of said strips during said movement to form an upstanding two-ply rib upon the other strip, introducing adhesive between the plies of said rib as the strip is being folded, securing the two strips together adjacent to opposite sides of the rib after the adhesive has been introduced, bending the rib sideways to position it at an inclined angle relatively to said other strip, and applying pressure progressively to the rib to shape said rib and set it firmly at said angle.

51. That improvement in methods of making ribbed strips adapted for attachment to insoles to provide sewing ribs thereon which comprises providing a pair of strips having pressure-responsive cement on one side thereof, positioning said strips in superimposed relation to each other with their cemented sides facing away from each other, feeding the strips in unison in a predetermined path, folding the upper strip widthwise during the feeding movement to form an upstanding two-ply rib resting upon the lower strip with flanges extending laterally from opposite sides of the rib and overlying said lower strip, securing the two strips together progressively along opposite sides of the base of the rib by stitches located substantially in the creases formed between the rib and said flanges, turning the flanges upwardly against the rib during movement of the strips in said path and then bending the rib and flanges into an inclined position relatively to said lower strip, and applying pressure progressively to the rib and flanges in the inclined position into which they are bent, thereby causing the flanges to adhere to the two-ply rib and to each other beyond the rib by reason of said pressure-responsive cement to enclose said two-ply rib and form a four-ply rib, said pressure also shaping the four-ply rib and setting it firmly in said inclined position.

52. That improvement in methods of making ribbed strips adapted for attachment to insoles to provide sewing ribs thereon which comprises positioning a pair of substantially flat strips in superimposed relation to each other, said strips having pressure-responsive cement on their oppositely facing sides, moving the strips in unison in a rectilinear path, folding the upper strip widthwise upon itself during said movement to form a two-ply rib on the lower strip with flanges projecting from opposite sides of the rib, injecting adhesive between the plies of said rib before the folding operation is completed, securing the two strips together along opposite sides of the base of the rib, turning the opposite flanges upwardly against the rib and bending the rib and flanges into an acute angle relatively to the lower strip, and applying pressure progressively to said rib and flanges as the strips move along said path to cause the flanges to adhere to the rib by reason of the pressure-responsive cement thereon and also to become permanently shaped and set at said acute angle.

53. That improvement in methods of making ribbed strips adapted for attachment to insoles to provide sewing ribs thereon which comprises providing a pair of substantially flat strips coated on one side only with pressure-responsive cement, positioning the strips in superimposed relation to each other with their cemented sides facing away from each other, moving the strips in unison in a predetermined path, folding the upper strip widthwise during such movement to form a two-ply rib on the lower strip with flanges projecting from opposite sides of the base of the rib and overlying said lower strip, injecting cement into the fold of the upper strip while said strip is being folded, inserting stitches through the two strips at opposite sides of the base of the rib, said stitches being located substantially in the apexes of the angles formed between the base of the rib and said flanges, turning the flanges upwardly against the opposite sides of the two-ply rib, bending the rib and flanges into an acute angle relatively to the lower strip during the flange-turning operation, and applying pressure progressively to the rib and flanges to cause the flanges to adhere to the rib and to each other beyond the rib by reason of the pressure-responsive cement thereon, thereby completely enclosing said rib to form a four-ply rib, said pressure acting also to position the rib normally at said acute angle.

FREDERIC E. BERTRAND.
ALFRED S. CLARK.

REFERENCES CITED

The following references are of record in the file of this patent:

UNITED STATES PATENTS

| Number | Name | Date |
| --- | --- | --- |
| 1,265,399 | Strobeck | May 7, 1918 |
| 1,301,808 | Brackett | Apr. 29, 1919 |
| 1,630,754 | McNulty | May 31, 1927 |
| 1,895,709 | Emerson | Jan. 31, 1933 |
| 1,958,131 | Davidson | May 8, 1934 |
| 2,070,200 | Ernst | Feb. 9, 1937 |
| 2,149,456 | Merrick | Mar. 7, 1939 |
| 2,282,168 | Cunnington | May 5, 1942 |
| 2,284,727 | Cunnington | June 2, 1942 |